Dec. 22, 1931.   S. S. CAMPBELL   1,837,406
HEAD REST
Filed Oct. 18, 1929   2 Sheets-Sheet 1

Inventor
Susie S. Campbell,
By Smith, Michael & Gardiner,
Attorneys

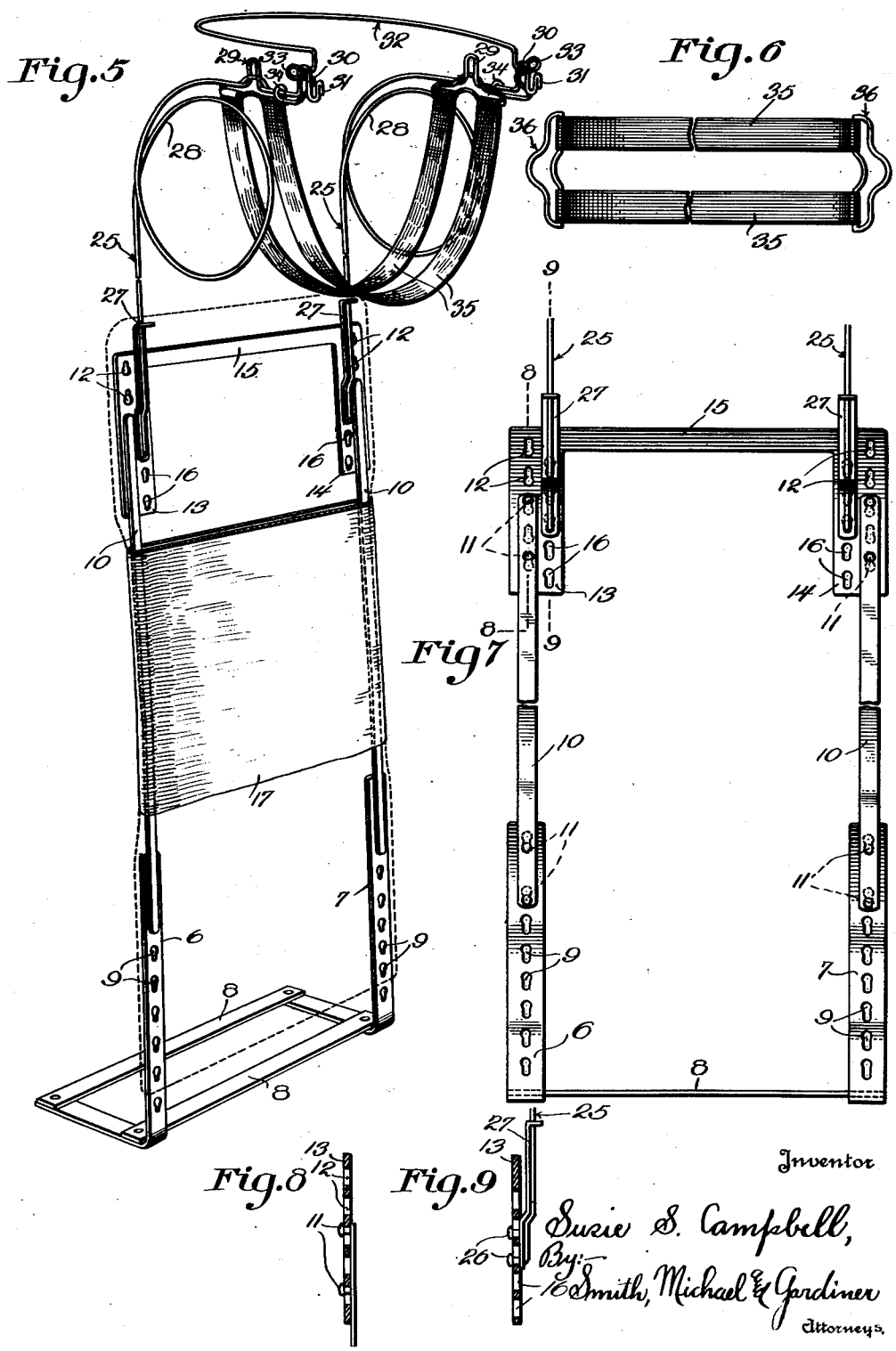

Patented Dec. 22, 1931

1,837,406

UNITED STATES PATENT OFFICE

SUSIE S. CAMPBELL, OF MARLIN, TEXAS

HEAD REST

Application filed October 18, 1929. Serial No. 400,567.

My invention relates to head rests, and while capable of general use on chairs and seats of all kinds and description, has particular reference to a head rest for the driver or passengers of an automobile.

It is an object of my invention to provide a head rest adapted for association with a chair or seat, particularly the front or rear seat of an automobile, and capable of supporting the driver's or passenger's head to absorb the jars and shocks and to take the strains off of the spine, neck and shoulder muscles.

It is a further object of my invention to provide a head rest adapted for association with the front or rear seats of an automobile, capable of adjustment to either pivotally support the head of the driver or passenger of the vehicle in upright or reclining position; or to remain in spaced relation to the driver's or passenger's head and to be engaged therewith when the vehicle encounters irregularities in the roadway to resiliently support the driver's or passenger's head to relieve the spine, neck and shoulder muscles of the jars and shocks incident to such road irregularities.

It is a still further object of my invention to provide a head rest including means for conveniently associating the same to the front or rear seat of an automobile, and having novel means whereby the head rest may be readily adjusted to drivers or passengers of different heights, to either positively and resiliently support the head of the driver or passenger in upright position; to enable the same to be adjusted to remain in spaced relation to the head of said driver or passenger and adapted to be engaged by the head when and only when the vehicle encounters irregularities in the roadway to resiliently support the driver's or passenger's head to relieve the spine, neck and shoulder muscles from the jars and shocks incident to such road irregularities; or to be adjusted to resiliently support the head of the driver or passenger when said driver or passenger desires to rest in relaxed and reclined position.

A still further object of my invention is to provide an adjustable head rest which is simple in construction, cheap to manufacture, easy to attach and adjust, and highly efficient in the purposes for which designed.

In the accompanying drawings forming a part of this specification, and in which like numerals are employed to designate like parts throughout the several views:

Fig. 5 is a perspective view of my improved head rest showing the same in assembled relation.

Fig. 6 is a plan view of the supporting sling member adapted to be engaged by the head of the driver or passenger of the automobile.

Fig. 7 is a plan view of a portion of the device shown in Fig. 5, and

Figs. 8 and 9 are sectional views respectively on the lines 8—8 and 9—9 of Fig. 7.

In the accompanying drawings wherein for the purpose of illustration I have shown several preferred embodiments of my invention, the numeral 1 designates the side of an automobile, having the usual steering wheel 2, top 3, and bottom and back seat cushions 4 and 5 respectively. All of the above identified members may be of any conventional or preferred construction and form no part of my present invention.

Figure 1:
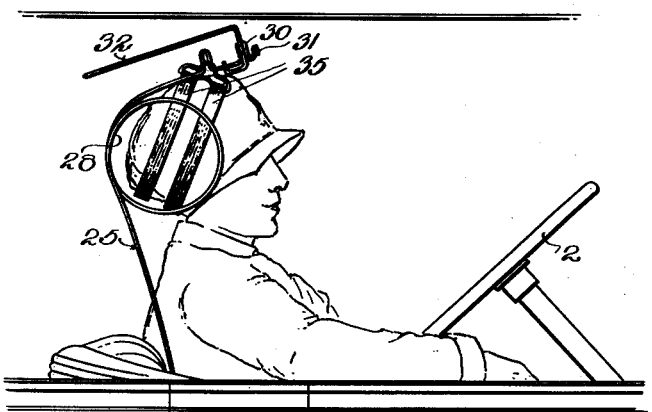
Figure 1 illustrates a side elevation of my improved head rest and a portion of an automobile, this figure showing the head rest in position to support the head of the driver of the vehicle in relaxed position.
Figure 2:
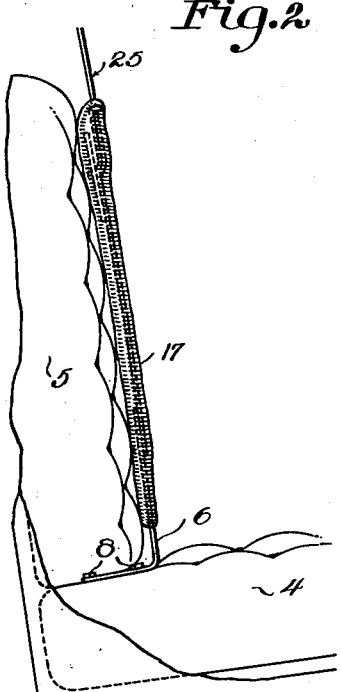
Fig. 2 is a side elevation of one form of attaching and supporting means for the head rest.

Referring to that form of my invention shown in Figures 2, 5 and 7, it will be seen that I provide a pair of L-shaped members 6 and 7, maintained in permanent, parallel spaced relation by means of cross-bars 8 attached to and extending between the shorter legs of said L-shaped members. The long, upright legs of each of these L-shaped members are provided with a plurality of alined and spaced key-hole slots 9. When in position on a chair or seat or in an automobile, the short legs of these L-shaped members are positioned to extend between the bottom edge of the back cushion and the top of the seat cushion, as clearly shown in Figure 2.

In chair or automobile seat constructions in which the cushion 4 extends above the lower edge of the back seat cushion 5, or where there is an appreciable space between the back seat cushion and the seat cushion, the short legs of the L-shaped brackets 6 and 7 are disposed in front of the longer, upright legs of the L-shaped brackets and are positioned beneath the seat cushion to rest on the seat frame.

A pair of elongated bar members 10 are provided, each having near its upper and lower ends a pair of spaced, headed stud members 11, extending rearwardly from the face of each bar 10, the studs 11 at the lower end of each bar 10 entering into and cooperating with any two of the key-hole slots 9, to adjust or regulate the relative position of the bars 10 with respect to the L-shaped members 6 and 7 by means of which they are supported. When necessary or desirable, the bars 10 may be slightly curved to conform to the curvature of the back cushion. The stud members 11 at the upper ends of the bars 10 are adapted to engage any two of the inverted key-hole slots 12 arranged in alinement in plates 13 and 14, these two plate members being connected by a cross brace 15 either attached to the plates or formed integrally therewith. It will thus be seen that I have provided what in effect will be an adjustable rectangular-shaped frame, the two long or vertical side members of which are capable of two adjustments, i. e., a lower adjustment between the bars 10 and the L-shaped members 6 and 7, and an upper adjustment between the bars 10 and the plates 13 and 14.

Figure 3:
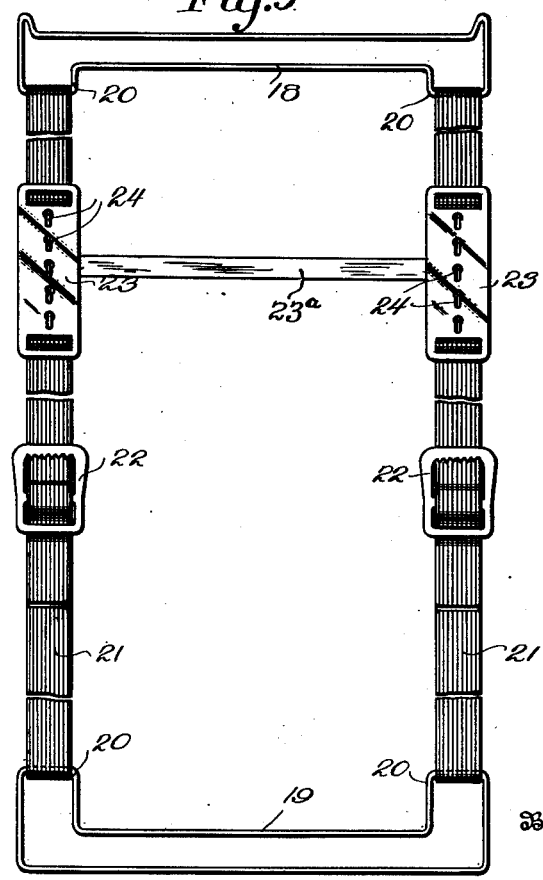
Fig. 3 is a plan view of a modified form of attaching and supporting means for the head rest.
Figure 4:
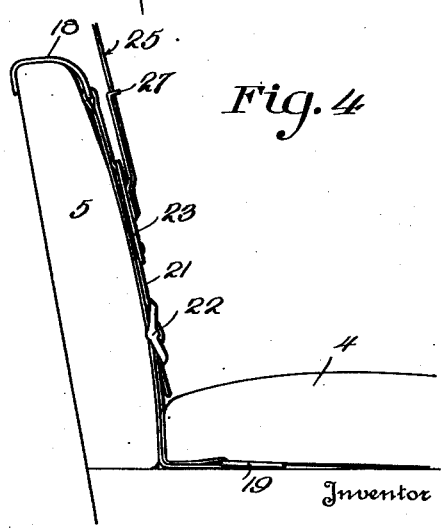
Fig. 4 is a side elevation of that form of my invention shown in Fig. 3, showing the same attached to the back of an automobile seat.

In addition to the inverted key-hole slots 12 in the plates 13 and 14, each of said plates is provided with a second row of alined and spaced key-hole slots 16 for a purpose to be hereinafter described. If desired, the entire structure just described and comprising the rectangular frame, may be enclosed within a linen or other cover 17 which will reside between the back cushion 5 and the back of the driver or passenger, and this entire device constitutes my preferred form of supporting means for the spring and sling structure of my head rest to be hereinafter described Instead of making the support means as shown and described in Figures 2, 5 and 7, I may resort to the construction shown in Figs. 3 and 4, wherein is shown an upper member 18 and a lower member 19 each made of wire or other suitable material and each having at its opposite ends, extensions 20 each adapted to be engaged by a flexible strap 21 provided with a buckle member 22 by means of which the straps may be adjusted to regulate the distance between the upper and lower members 18 and 19 respectively. This upper member 18 is bent or curved to hook over the top edge of the seat back, whereas the lower member 19 is flat and is adapted to rest beneath the seat cushion 4, as clearly shown in Fig. 4.

In chair or automobile seat constructions in which there is a space between the lower edge of the back and the seat, the lower member 19 may be bent to hook under the lower edge of the seat back. Each of the flexible straps 21 carries a plate 23 which is slidably and frictionally mounted thereon and which is provided with a plurality of alined and spaced keyhole slots 24, these two plates 23 being connected by a cross brace 23a either attached to the plates or formed integrally therewith. When it is desired to attach this form of my invention to a chair or seat or in an automobile, the upper member 18 is hooked over the top edge of the back of the seat, the lower member 19 is placed beneath the seat cushion 4 and the straps 21 are drawn tight and held in position by means of the buckle 22. The plates 23 are moved along the straps 20 and are held in their adjusted position by reason of their frictional contact with the said straps. If desired, the entire structure just described and comprising the supporting means for the spring and sling structure of my head rest to be hereinafter described, may be enclosed within a linen or other cover corresponding to the cover 17 described in connection with the device shown in Figs. 2, 5 and 7.

The spring and sling portion of my improved head rest, comprises spring means for supporting a sling or band adapted to be engaged by the driver's or passenger's head and to resiliently support the head to relieve the spine, neck and shoulder muscles of the jars and shocks incident to irregularities in the roadway, or to support the head in relaxed or reclining position. To this end, I attach to each of the plates 13 and 14 or to the plates 23 at opposite sides of the supporting means, a spring wire member 25, the lower end of which is provided with a pair of L-shaped brackets 27, the long leg of each bracket having a pair of spaced headed studs 26 extending rearwardly from the face of each bracket and adapted to enter and be retained within a pair of the key-hole slots 16 or 24 in the plates 13, 14 or 23 respectively, the selected key-hole slots determining the height and relative vertical position of the spring members with respect to the said supporting plates or members. The short leg of each of the L-shaped brackets 27 is pierced to permit the passage therethrough of the lower end of the spring member 25, the ends of said spring member extending along the face of the long leg of each of the L-shaped brackets and being welded thereto. The spring members 25 extend upwardly from the attaching plates 13, 14 or 23 and are bent into a resilient loop 28 of any desired shape or configuration. Beyond the loop 28 the wire member is extended in horizontal position as shown in Fig. 5 of the accompanying drawings, and is bent to form three inverted U-shaped attaching loops 29, 30 and 31. The outer or free extremities of the two spring members 25 are hinged together by a third spring member 32 which is bent to segmental form as shown in Fig. 5, the ends of this segmental spring member 32 being bent to form loop members 33 adapted to enter the attaching loops 30 to maintain the spring member 32 in horizontal position. The spring member 32 terminates in closed eyes 34 which loosely engage the spring member 25 between the two pairs of attaching loops 29 and 30. When the device is in assembled and operative position as clearly shown in Fig. 5, the spring members 25 extend upwardly from their attaching plates 13, 14 or 23 and the segmental spring member 32 has its loops 33 engaged within the loops 30. Thus the segmental spring member 32 holds the spring members 28 apart in parallel spaced relation and functions as a third spring member to resiliently resist any backward pressure on the ends of the spring members 28.

The sling member of my improved head rest, i. e., the portion adapted to be engaged by the head of the driver or passenger, is clearly shown in Fig. 6, and comprises one or more flexible strap members 35 attached at each end to a wire loop 36, the shape of these wire loops 36 being such as to hold the straps in parallel spaced relation, and those portions of the loops 36 between the two straps being curved to provide an inner and outer portion, either of which can be selectively engaged with the attaching loops 29, 33 or 31 to accomplish the desired adjustment of the sling members with respect to the head of the driver or passenger of the vehicle.

Referring now to the operation of my improved head rest, it is to be noted that the same is composed of a plurality of associated parts which can be readily assembled and that the device can be readily disassembled to enable the entire structure to be stored or packed in a relatively small box or kit. The rectangular supporting member can either be taken apart and stored away or can be left in place on the seat where, due to the presence of the linen or other cover 17, the device will function as a seat cover for the driver's or passenger's back. Assuming that the device has been completely disassembled and it is desired to use the same as a head rest for the driver or passenger, the L-shaped bracket members 6 and 7 are inserted between the lower edge of the back cushion 5 and the top member of the bottom cushion 4, as clearly shown in Fig. 2. Or if the construction of the seat makes it necessary, the L-shaped members 6 and 7 may be turned toward the front and positioned beneath the seat cushion 4. The bar members 10 are then associated with the L-shaped members 6 and 7 with their studs 11 entering any pair of the key-hole slots 9—9. The studs 11 at the upper end of the bars 10 are then inserted into any pair of the inverted key-hole slots 12—12 in the plates 13 and 14, the selection of said slots being determined by the desired height of the cross-bar or brace 15, the selection of slots and consequently the relative adjustment being such that the cross-bar or brace 15 occupies a position just below the shoulders of the driver or passenger. The linen or other cover 17 is then placed over the framework and functions as a seat cover between the driver's or passenger's back and the back cushion 5. The two spring members 25 have their upper extremities hingedly connected by the third spring member 32, the closed eyes 34 engaging those portions of the springs 25 between the loops 29 and 30 and the loops 33 extending through and firmly engaging the loops 30. When this has been done, the brackets 27 are inserted through slits in the cover 17 immediately above the plates 13 and 14 and are brought to such a position that the studs 26 engage any pair of the key-hole slots 16 in plates 13 and 14. If it is desired to use the sling member 35 to positively engage and support the head in an easy reclining position, the outer central portion of the loops 36 are engaged over the loops 31, with the sling suspended between the two spring members 25. The head of the driver or passenger will therefore be positively engaged by the straps 35, and the head will be resiliently supported in an easy reclining position, the three springs 28, 28 and 32 functioning to resiliently support the head of the driver or passenger and relieving the spine, neck and shoulder muscles of jars and shocks incident to irregularities in the roadway on which the vehicle is travelling. If it is desired to position the straps 35 a short distance from the driver's or passenger's head so that in the normal upright position of the head there will be no positive contact between the head and straps, the loops 36 are brought straight across in front and over 31 to engage the loops 33 and when thus engaged, the straps will not touch the head but will be positioned closely adjacent the head to be engaged when the head is thrown back by jolts and shocks due to irregularities in the roadway, the springs 25, 25 and 32 functioning to absorb said shocks and jars. If it is desired to position the straps so that the head will engage the straps only when the head is moved back to a positive reclining position, as, for example, when it is desired to rest or sleep, the loops 36 are engaged with the adjusting loops 29, 29, and by assuming a relaxed position, the head of the driver or passenger will be resiliently supported and the spring members will absorb all jars and shocks. It will therefore be seen that the device is capable of numerous adjustments whereby the sling or straps 35 may be placed in the desired positions with relation to the head of the driver or passenger. The supporting plates 13, 14 can be raised or lowered to assume the proper height by means of the key-hole slots 9, 9 and 12, 12. The position of the supporting springs 25, 25 can be regulated by means of the key-hole slots 16, 16. The position of the straps 35 can be regulated by the selective engagement between the loops 36 and any of the pairs of loops 29, 33 or 31, it being noted that by providing an inner and outer loop-engaging position on the loops 36, either of which may be engaged with the attaching loops 29, 33 or 31, a very accurate adjustment of the straps 35 with relation to the head may be accomplished. Instead of employing the supporting frame described in connection with the form of my invention shown in Figures 2, 5 and 7, I may use the device shown in Figures 3 and 4. In this form of my invention, the upper portion 18 is hooked over the upper edge of the back of the seat, the lower end 19 is positioned beneath the seat cushion 4, or if the construction of the seat makes it necessary, the lower member 19 may be bent to hook under the lower edge of the seat back, and by means of the buckles 22 and the straps 21 are tightened to hold the device on the seat. The plates 23 which slidably and frictionally engage the straps 21 are moved along said straps until they assume the proper position depending on the height of the driver or passenger for whom the head rest is to be adjusted. The lower ends of the springs 25, 25 are then associated with the key-hole slots 24 in the plate 23 and are supported thereby to function in the identical manner described in connection with the device shown in the other figures of the accompanying drawings.

It is to be understood that the forms of my invention herein shown and described are to be taken as preferred examples of the same, and that various changes in the shape, size and arrangement of parts may be resorted to without departing from the spirit of the invention or the scope of the subjoined claims.

Having thus described my invention, what I claim is:

1. A head rest comprising a spring member made of resilient wire and having an intermediate loop portion, means at the lower end of the spring member for connecting said spring member to a seat, a plurality of spaced projections formed in the wire at the upper end thereof beyond the loop portion, a sling adapted to resiliently support the head of the occupant of the seat, and means on the sling adapted to engage any of the projections on said spring member to regulate the relative position of the sling with respect to the head of the occupant of said seat.

2. A head rest comprising a spring member made of resilient wire and having an intermediate loop portion, means at the lower end of said spring member for connecting said spring member to a seat, a plurality of spaced projections formed in the wire at the upper end thereof beyond the loop portion, a sling adapted to resiliently support the head of the occupant of the seat, and a double loop carried by the sling, either loop of which may engage any one of the projections on the spring member to regulate the relative position of the sling with respect to the head of the occupant of said seat.

3. A head rest comprising a spring member having at its lower end a pair of projecting studs, a plate provided with a plurality of spaced key-hole slots any two of which may be engaged by the projecting studs of the spring member to secure adjustment of said member relative to the plate, means for attaching the plate to a seat, means for adjusting the position of said plate with respect to said seat, and a sling connected to said spring member and adapted to resiliently support the head of the occupant of said seat.

4. A head rest comprising a spring member having attaching means at its lower end, a plate provided with a plurality of attaching means any of which may be engaged by the attaching means of the spring member to secure the adjustment of the spring member with respect to the plate, a second set of attaching means on the said plate, a supporting member having attaching means adapted to engage the second set of attaching means on the plate to secure the adjustment of the plate with respect to the supporting member, means for attaching the plate to the seat, and a sling connected to the spring member and adapted to resiliently support the head of the occupant of said seat.

5. A head rest comprising a spring member having at its lower end a pair of projecting studs, a plate provided with a plurality of spaced key-hole slots any two of which may be engaged by the projecting studs of the spring member to secure adjustment of said member relative to the plate, said plate also having a plurality of inverted key-hole slots, a bar member having at its upper end a pair of projecting studs adapted to engage any two of said inverted key-hole slots in the plate to secure adjustment of said supporting member relative to the plate, means at the lower end of the bar member for adjustably attaching said bar member to a seat, and a sling connected to said spring member and adapted to resiliently support the head of the occupant of said seat.

6. A head rest comprising a pair of spaced vertically-positioned spring members, means for attaching the lower ends of said spring members to a seat, a sling connected to the upper ends of said spring members and adapted to resiliently support the head of the occupant of said seat, a plurality of attaching loops at the upper ends of said spring members any one of which may be engaged by the sling to regulate the position of said sling with respect to the spring members, and a third spring member extending between the vertically-positioned spring members and engaging one of the loops at each end of said spring members.

7. A head rest comprising a pair of spaced vertically-positioned spring members, means for attaching the lower ends of said spring members to a seat, a sling mounted at the upper ends of said spring members and adapted to resiliently support the head of the occupant of said seat, a plurality of attaching loops at the upper ends of said spring members any one of which may be engaged by the sling to regulate the position of said sling with respect to the spring members, and a third spring member extending between the vertically-positioned spring members and having a loop at each end adapted to enter and extend through one of the loops at each end of said spring members, the loops on the third spring members also serving as attaching loops for the said sling.

In testimony whereof I hereunto affix my signature.

SUSIE S. CAMPBELL.